(12) United States Patent
Kim

(10) Patent No.: US 9,551,347 B2
(45) Date of Patent: Jan. 24, 2017

(54) WATER-PUMP MOTOR USING A WATERPROOF STATOR, AND WATER PUMP

(75) Inventor: Byoung Soo Kim, Anyang-si (KR)

(73) Assignee: AMOTECH CO., LTD., Incheon (KR)

( * ) Notice: Subject to any disclaimer, the term of this patent is extended or adjusted under 35 U.S.C. 154(b) by 526 days.

(21) Appl. No.: 14/117,120

(22) PCT Filed: May 15, 2012

(86) PCT No.: PCT/KR2012/003787
§ 371 (c)(1),
(2), (4) Date: Nov. 12, 2013

(87) PCT Pub. No.: WO2012/157935
PCT Pub. Date: Nov. 22, 2012

(65) Prior Publication Data
US 2014/0227118 A1     Aug. 14, 2014

(30) Foreign Application Priority Data
May 18, 2011  (KR) .................. 10-2011-0046815

(51) Int. Cl.
*F04B 35/04*   (2006.01)
*F04D 25/06*   (2006.01)
(Continued)

(52) U.S. Cl.
CPC ............. *F04D 25/06* (2013.01); *F04D 13/064* (2013.01); *F04D 13/0606* (2013.01);
(Continued)

(58) Field of Classification Search
CPC  F04D 13/064; F04D 13/0686; F04D 13/0606; F04D 25/06; H02K 1/148; H02K 1/146; H02K 1/276; H02K 5/08; H02K 5/128; H02K 5/1285; H02K 7/04; H02K 21/12; H02K 21/14; H02K 21/16
(Continued)

(56) References Cited

U.S. PATENT DOCUMENTS 4,277,115 A    7/1981  Stuwe et al.
4,564,777 A *  1/1986  Senoo ................... H02K 1/278
                                                310/156.22
(Continued)

FOREIGN PATENT DOCUMENTS

JP       2000050556     2/2000
KR    1020050054587     6/2005
(Continued)

OTHER PUBLICATIONS

International Search Report—PCT/KR2012/003787 dated Nov. 14, 2012.

*Primary Examiner* — Charles Freay
(74) *Attorney, Agent, or Firm* — Cantor Colburn LLP

(57) ABSTRACT

Provided are a water pump motor that employs a stator core of an outer winding method that can use a low-cost ferrite magnet by minimizing an air gap between a magnet of a rotor and a stator core, and that heightens a fill factor, to thereby maximize efficiency of the motor, and a water pump using the water pump motor. The water pump motor includes a stator and an inner type rotor, in which the stator includes: a stator core whose inner circumferential portion is annularly interconnected, in which a number of protrusions are radially extended and formed; insulating bobbins that surround the stator core; a coil wound around the outer circumference of each bobbin; and an annular back yoke that surrounds in contact with the outer end of the stator core. The insulating bobbins are annularly molded to surround the inner circumferential portion of the stator core, and entirely surround the inner circumferential portion of the stator core, to thus make the inner side surface play a role of a sealing cover, and the rotor includes ferrite magnets in opposition to the inner side surfaces of the bobbins.

6 Claims, 7 Drawing Sheets

(51) Int. Cl.
*F04D 13/06* (2006.01)
*H02K 5/08* (2006.01)
*H02K 5/128* (2006.01)
*H02K 1/14* (2006.01)
*H02K 1/27* (2006.01)

(52) U.S. Cl.
CPC ............ *F04D 13/0686* (2013.01); *H02K 5/08* (2013.01); *H02K 5/128* (2013.01); *H02K 1/148* (2013.01); *H02K 1/276* (2013.01)

(58) Field of Classification Search
USPC .................. 417/423.7; 310/43, 87, 88, 194
See application file for complete search history.

(56) References Cited

U.S. PATENT DOCUMENTS

| | | | | |
|---|---|---|---|---|
| 7,750,529 | B2* | 7/2010 | Tajima | H02K 5/12 310/257 |
| 2009/0081059 | A1* | 3/2009 | Seki | F04D 13/064 417/420 |
| 2011/0116948 | A1* | 5/2011 | Yi | H02K 1/148 417/410.1 |
| 2012/0183421 | A1* | 7/2012 | Kim | F04D 13/06 417/423.7 |

FOREIGN PATENT DOCUMENTS

| | | |
|---|---|---|
| KR | 1020090061480 | 6/2009 |
| KR | 1020110032988 | 3/2011 |

* cited by examiner

WATER-PUMP MOTOR USING A WATERPROOF STATOR, AND WATER PUMP

TECHNICAL FIELD

The present invention relates to a water pump motor that is provided for supplying cooling water for an engine, and a water pump using the same, and more particularly, to a water pump motor using a stator of a waterproof structure, which can maximize efficiency of a motor and reduce a manufacturing cost, and a water pump using the same.

BACKGROUND ART

In general, a water pump motor is used to drive a water pump that is installed in a drain water tank of a washing machine, or is used as a driving source of a water pump that is used for circulation of a coolant that cools an engine. The water pump equipped with the water pump motor works under an environment that the inside of the water pump always directly contacts water.

Thus, a component that is called a mechanical seal is used in a water pump for sealing purposes in order to protect a motor from water when the water of the inside of the water pump is drained to the outside of the water pump or in order to prevent failure of bearings or shortened life of belts due to leakage of a coolant.

A conventional water pump that uses a mechanical seal requires a separate additional post-processing work in order to have the mechanical seal. Accordingly, a processing cost and a material cost for the mechanical seal rise up to thereby become a factor of raising the prime cost of the water pump using a water pump motor. In addition, water or foreign matters flowing from the outside of the water pump may be introduced into the water pump motor, to thereby cause breakdown of the motor.

A bearing structure that is used in a water pump motor having a can cover in order to protect the water pump motor was disclosed in the U.S. Pat. No. 4,277,115. The bearing structure that is used in the disclosed water pump motor having the can cover is configured to include a ring of an elastomer or of felt that is disposed between a calotte bearing and a bearing support element, and grooves that are formed in the bearing support element and the calotte bearing near the ring. Here, the ring of the elastomer or of the felt is disposed between the calotte bearing and the bearing support element and the calotte bearing and the bearing support element are provided with grooves formed in the region of the ring. The calotte bearing mount is particularly useful in pumps with canned motors for delivery of electrolyte liquid in fuel cell units.

In the above-described water pump having the can cover, water introduced into the water pump motor from the water pump can be blocked to some extent. However, the can cover should be separately produced to be assembled with the motor, to thereby cause the prime cost of the water pump to rise and productivity to lower. Further, a waterproof structure for water entering from the outside of the water pump motor is not presented, to thus require for additional measures for waterproof.

Meanwhile, according to the conventional art, to solve the problems, there was presented a water pump motor that is formed by insert-molding a number of split cores with a bulk mould compound (BMC) and inserting a metallic can into the inside thereof.

However, the conventional water pump motor employs an inner rotor structure, and has not only narrow slots between T-shaped teeth provided in a stator core, but also employs an inner coil winding method, to thus cause uneasy coil windings. In addition, the conventional water pump motor needs a separate wiring structure for connection between the coil windings wound in each split core, to thereby cause structure of a motor to become very complex and workability to become significantly deteriorated.

In addition, as described above, the stator is constituted by the inner winding method, and thus a coil winding space is narrow, to thus fail to increase a fill factor and enhance the efficiency of the motor.

Moreover, since an air gap between a rotor and a stator is structurally large in size, an expansive Nd magnet whose magnetic force is stronger than a low-cost ferrite magnet should be used, to thereby cause high production costs. In addition, unless the size of the water pump (in particular, the diameter thereof) is increased, a low-magnetic ferrite magnet may not be used and a high-magnetic Nd magnet should be used, in order to obtain a desired pump output.

However, the Nd magnet has no corrosion resistance unlike a low-cost ferrite magnet having a corrosion resistance capability, and thus should have a water-proof structure surrounding the Nd magnet so that the Nd magnet does not touch the water. As a result, since an air gap between the stator core and the magnet becomes large, the motor efficiency was further degraded.

DISCLOSURE

Technical Problem

To solve the above problems or defects, it is an object of the present invention to provide a water pump motor employing a stator core capable of using an outer winding method, to thereby heighten a fill factor to thus maximize efficiency of the motor and at the same time promote winding efficiency, and a water pump using the water pump motor.

It is another object of the present invention to provide a water pump motor using a stator core whose inner portion is formed into a slot-less type so as to allow the stator core to employ an outer winding method, to thereby suppress noise and vibration due to a cogging torque, and whose T-shaped teeth are assembled with an annular yoke.

It is still another object of the present invention to provide a water pump motor in which a waterproof cover for a stator is integrally formed at the time of forming a bobbin to insulate T-shaped teeth, to thereby minimize an air gap between a stator core and a rotor magnet and to thus be capable of using a low-cost ferrite magnet instead of an expensive Nd magnet, and a water pump with the water pump motor.

It is yet another object of the present invention to provide a water pump motor that cannot only employ a brass bushing for a "−" balance structure, but also employ a "+" balance structure that is cheaper than a brass bushing, to thereby remarkably reduce a manufacturing cost.

Technical Solution

To accomplish the above and other objects of the present invention, according to an aspect of the present invention, there is provided a water pump motor having a stator and an inner type rotor that is placed on the inside of the stator, the water pump motor comprising:

the stator including: a stator core whose inner circumferential portion is annularly interconnected to allow outer windings, in which a number of protrusions are radially extended and formed;

insulating bobbins that are annularly molded to surround the respective protrusions of the stator core, and entirely surround the inner circumferential portion of the stator core, to thus make the inner side surface play a role of a sealing cover and the outer side surface play a role of limiting an area of a coil winding portion;

a coil wound around the outer circumference of each bobbin; and an annular back yoke whose inner circumferential portion is compressed and coupled in contact with the protrusions of the stator core; and the rotor including a number of ferrite magnets in opposition to the inner side surfaces of the bobbins.

According to another aspect of the present invention, there is provided a water pump comprising:

a pump body whose lower side is open and that is provided with an accommodation space on the inside;

a water pump motor comprising a stator that is coupled on the inner circumferential portion of the pump body, a plurality of magnets that are rotatably driven by the stator, and a rotor that is coupled with a drive shaft at the center thereof;

an impeller that is connected to the distal end of the drive shaft that penetrates the pump body and that is extended upwards; and an upper case that is coupled to the upper portion of the pump body to guide inlet and outlet of cooling water circulating by the impeller, wherein the stator is configured so that an annular back yoke is compressively coupled with protrusions of a stator core whose inner circumferential portion is annularly interconnected to allow outer windings, in which a number of protrusions are radially extended and formed, and insulating bobbins are formed in the protrusions and inner circumferential portion of the stator core, and the rotor is configured so that a number of ferrite magnets are radially attached on the outer circumference of the rotor core that is coupled to the outer circumference of the drive shaft and plays a role of the back yoke in opposition to the inner circumferential portions of the insulating bobbins.

According to another aspect of the present invention, there is provided a water pump comprising:

a pump body whose lower side is open and that is provided with an accommodation space on the inside;

a water pump motor comprising a stator that is coupled on the inner circumferential portion of the pump body, a plurality of magnets that are rotatably driven by the stator, and a rotor that is coupled with a drive shaft at the center thereof;

an impeller that is connected to the distal end of the drive shaft that penetrates the pump body and that is extended upwards; and an upper case that is coupled to the upper portion of the pump body to guide inlet and outlet of cooling water circulating by the impeller, wherein the stator is annularly molded so that insulating bobbins that are formed on the outer circumference of the stator core entirely surrounds the inner circumferential portion of the stator core, to thus make the inner side surface play a role of a sealing cover and the outer side surface play a role of limiting an area of a coil winding portion, and the rotor comprises ferrite magnets.

Advantageous Effects

As described above, the water pump motor according to the present invention employs a stator core capable of using an outer winding method, to thereby heighten a fill factor and to thus maximize efficiency of the motor.

In addition, the present invention to provide a water pump motor using a stator core whose inner portion is formed into a slot-less type so as to allow the stator core to employ an outer winding method, to thereby suppress noise and vibration due to a cogging torque, and whose T-shaped teeth are assembled with an annular yoke, to thereby remove a bulk mould compound (BMC) molding process for sealing and integrating the entire stator.

Further, the present invention enables a waterproof cover for a stator to be integrally formed at the time of forming a bobbin to insulate T-shaped teeth, to thereby minimize an air gap between a stator core and a rotor magnet and to thus be capable of using a low-cost ferrite magnet instead of an expensive Nd magnet, and to thus minimize a core loss of the stator core and greatly reduce a manufacturing cost.

In addition, the present invention cannot only employ a brass bushing for a "−" balance structure, but also employ a "+" balance structure that is cheaper than a brass bushing, to thereby remarkably reduce a manufacturing cost.

Furthermore, the present invention includes a stator of a single waterproof, and does not require a separate molded product for sealing magnets of a rotor, to thus simplify the structure to be easily manufactured.

BEST MODE

Hereinafter, water pumps and water pump motors according to preferred embodiments of the present invention will be described in detail with reference to the accompanying FIGS. 1 to 12, respectively.

Figure 1:
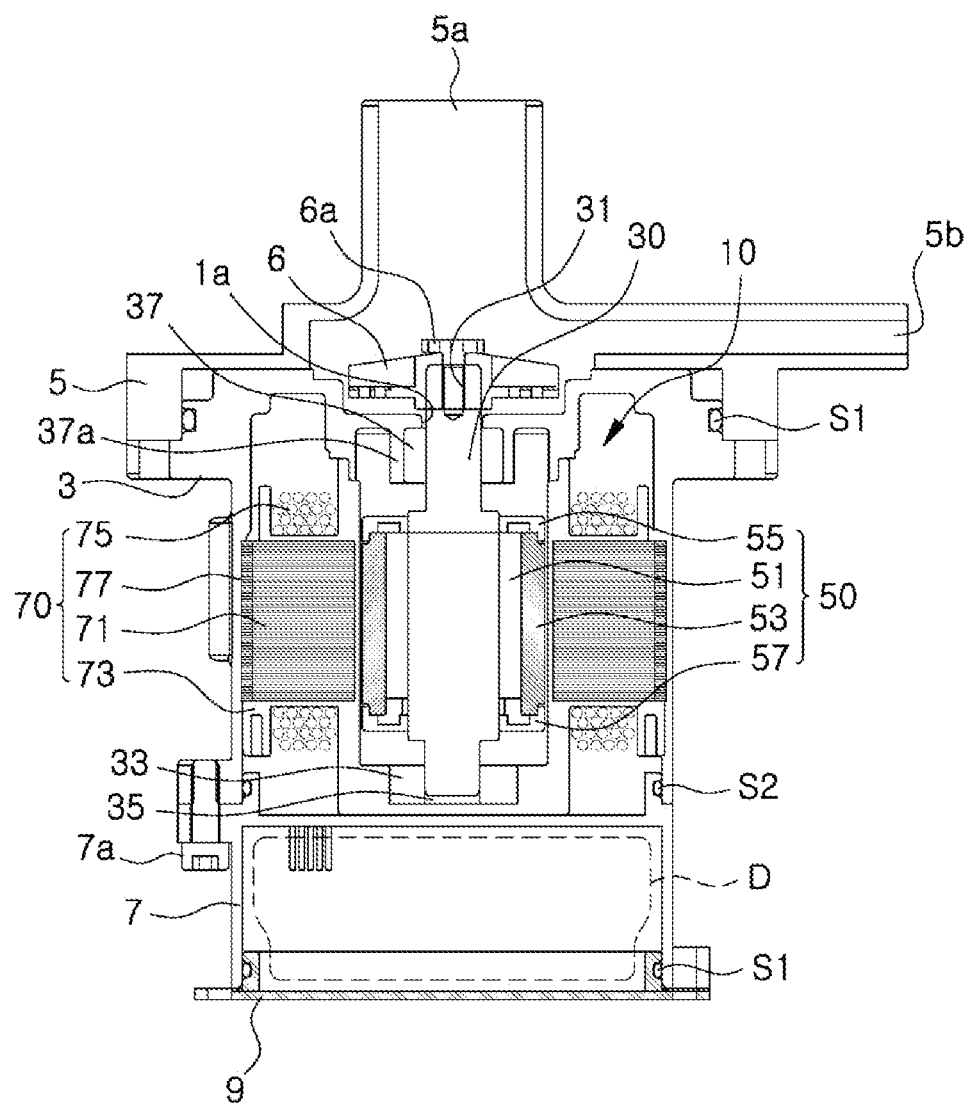
FIG. 1 is a cross-sectional view showing a water pump according to an embodiment of the present invention.

Referring to FIG. 1, a water pump 1 according to an embodiment of the present invention, includes a pump body 3, an upper case 5, an impeller 6, a drive driver case 7, a lower case 9, and a water pump motor 10.

The pump body 3 is closed at its upper part, and is open at its lower part, and includes a space in which a water pump motor 10 is mounted in its inside. In this case, the pump body 3 is includes a through-hole 1a through which a drive shaft 30 of the water pump motor 10 is penetrated and that is formed at its closed top.

The upper case 5 is coupled to the upper side of the pump body 3 to form a cooling water circulation path in which an inlet port 5a and an exhaust port 5b for circulating cooling water (for example, cooling water for water-cooling an engine block) are arranged in a roughly perpendicular direction. In addition, the upper case 5 is air-tightly maintained with the pump body 3 through a sealing 51. Accordingly, the cooling water flowing into the upper case 5 through the inlet port 5a can be fundamentally blocked from leaking between the upper case 5 and the pump body 3.

The impeller 6 is located at the point where the inlet port 5a and the exhaust port 5b of the upper case 5 meet. The impeller 6 is fixed to the drive shaft 30 drawn into the inside of the upper case 5, and is rotated at a predetermined rate by the drive shaft 30. In this case, the impeller 6 is fastened to the end of drive shaft 30 by a bolt type stopper 6a.

The drive driver case 7 includes a normal motor drive driver D for driving the pump drive motor 10 therein. In this case, the motor drive driver D is built in the drive driver case 7 at a state where the motor drive driver D is electrically connected to the pump drive motor 10. The drive driver case 7 is separably coupled by a fixing bolt 7a to close the opened lower side of the pump body 3. In addition, a sealing S2 is also arranged between the drive driver case 7 and the pump body 3.

The lower case 9 is coupled to the lower side of the opened side of the drive driver case 7, in which case the inside of the drive driver case 7 is air-tightly maintained through a sealing S3.

Hereinbelow, referring to FIGS. 2 to 8, the configuration of the water pump motor 10 will be described in detail.

Figure 2:
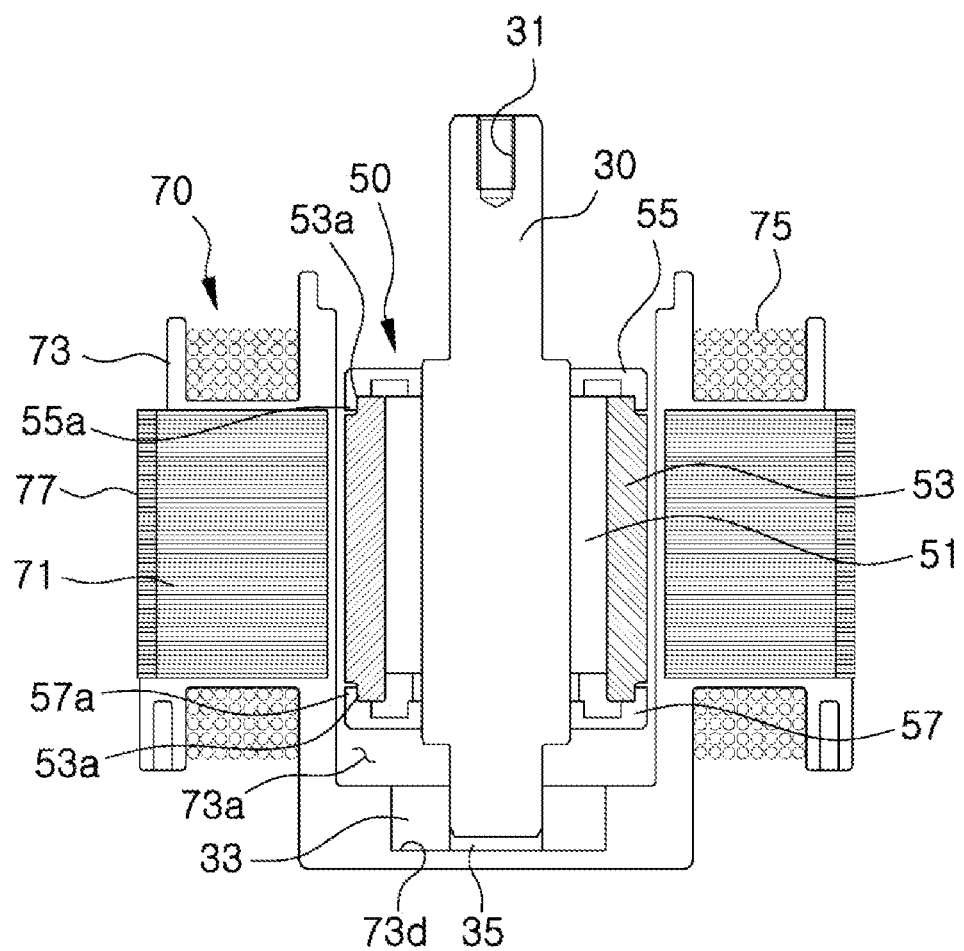
FIG. 2 is a cross-sectional view showing a water pump motor according to an embodiment of the present invention.
Figure 3:
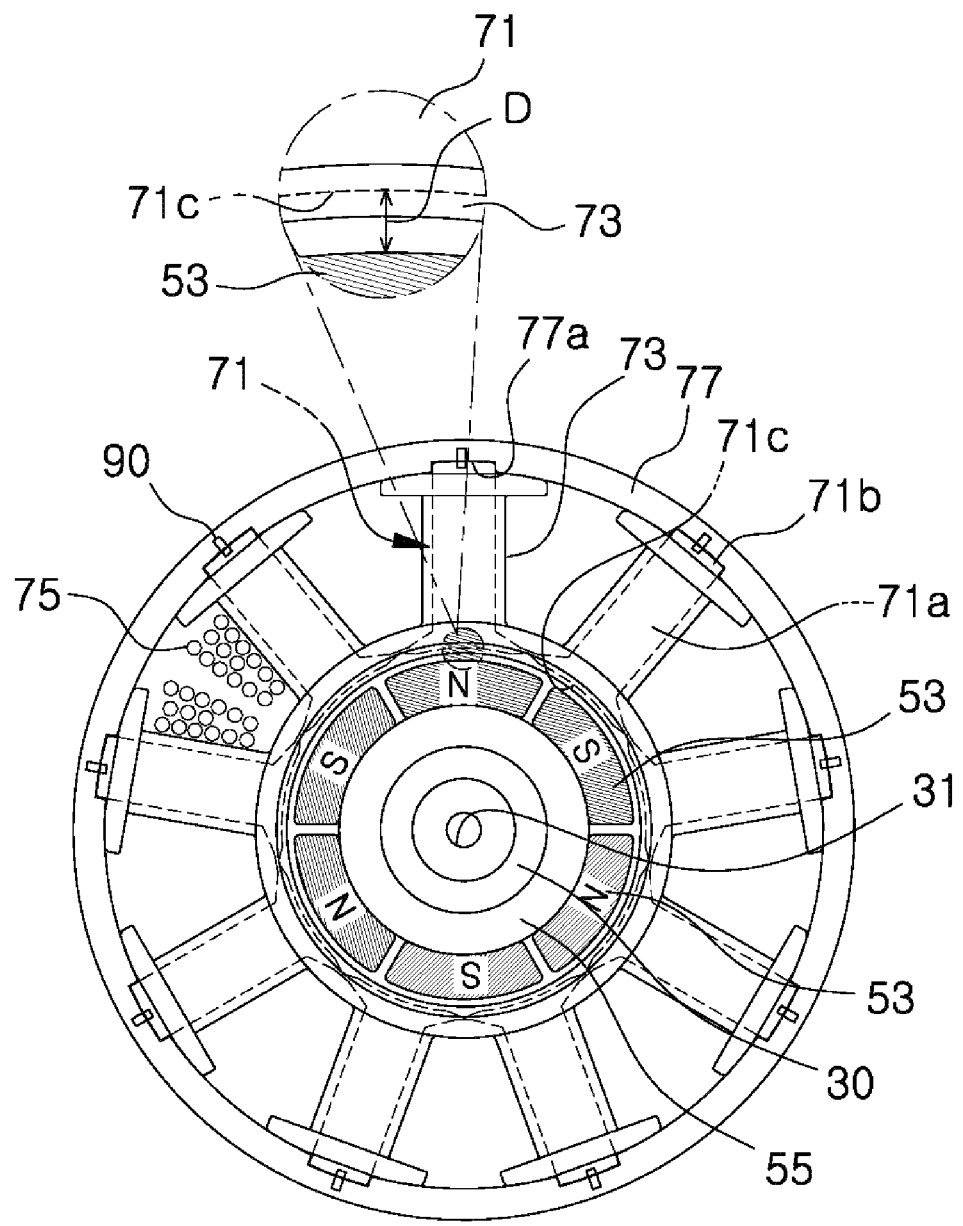
FIG. 3 is a plan view showing a water pump motor according to an embodiment of the present invention.

First, referring to FIGS. 2 and 3, the water pump motor 10 includes a drive shaft 30, a rotor 50 and a stator 70.

The drive shaft 30 is fixedly coupled with the rotor 50, in the state of penetrating through the center of the rotor 50 and the impeller 6 transfers a rotating power to the rotor 50 that is rotated by a magnetic force generated between the rotor and the stator 70. The upper end of the drive shaft 30 is protruded into a cooling water circulation path passing through the closed upper portion of the pump body 3, and is provided with a coupling groove 31 with which a stopper 6a for fixing the impeller 6 is coupled.

The upper portion of the drive shaft 30 is rotatably supported by an upper bearing 37 that is provided at the lower side of the through-hole 1a of the pump body 3, and the lower portion of the drive shaft 30 is rotatably supported by a lower bearing 33 and a bushing 35 that are placed in a bearing seated groove 73d of the bobbin 73.

The rotor 50 includes a rotor core 51, a number of magnets 53, and a pair of balance control members 55 and 57.

The rotor core 51 is made in a roughly cylindrical shape, and at the center of which the drive shaft 30 is fixedly combined. In this case, the rotor core 51 plays a role of the back yoke of the number of magnets 53.

The number of magnets 53 are permanent magnets where the N-poles or S-poles are magnetized, and in the present embodiment, are composed of three N-pole and S-pole magnets. Such a number of magnets 53, as shown in FIG. 3, N-poles and S-poles are arranged the outer periphery of the rotor core 51 in turn. In this case, the number of magnets 53 are temporarily attached to the rotor core 51 through an adhesive, and then both ends are completely fixed to the rotor core 51 by one pair of the balance control members 55 and 57.

In addition, the number of magnets 53 do not undergo a bulk mould compound (BMC) molding for a separate waterproof processing, and thus it is preferable to use ferrite magnets with a corrosion-resistant property. The ferrite magnets have a corrosion-resistant property to thus solve problems of corrosion and demagnetization, unlike Nd magnets that are corroded and demagnetized at a high-temperature. Moreover, since the ferrite magnets are not more expensive than Nd magnets, the manufacturing cost of the rotor can be reduced.

The pair of the balance control members 55 and 57 are provided for the "−" balance control of the rotor 50, and for example, are formed of brass that is easily cut. The pair of the balance control members 55 and 57 are combined on the respective upper and lower sides of the rotor core 51 and the plurality of magnets 53. In this case, locking steps 55a and 57a that are formed on the ends of the pair of balance control members 55 and 57 are respectively combined with locking recesses 53a that are formed at the top and bottom ends of the number of magnets 53, to thus fix the outer periphery of the rotor core 51 so that the number of magnets 53 are not separated from the rotor core 51.

The stator 70 includes a stator core 71, a bobbin 73, coils 75 and a back yoke 77.

Figure 4:
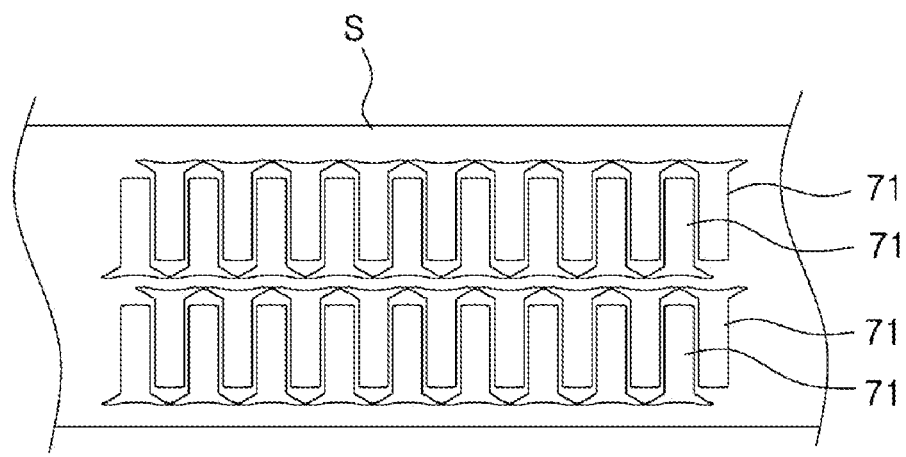
FIG. 4 shows a process of blank-molding a number of stator cores on a silicon steel plate to produce stator cores of a water pump motor according to an embodiment of the present invention.

The stator core 71 employs an outer winding structure and is made of a single core by laminating a number of thin plates. Such stator cores 71, as shown in FIG. 4, are fabricated by blank-molding the number of stator cores 71 that are lengthily arranged on a silicon steel plate S made of a thin plate strip. In this case, the respective stator cores 71 are blank-molded in the form where a pair of protrusions 71a are correspondingly fitted together. Accordingly, a core loss of the silicon steel plate S can be minimized in comparison with the case of blank-molding the stator cores in an annular form. As a result, although the expensive silicon steel plate is used, the core loss is minimized and thus the manufacturing cost of the stator 70 can be reduced.

Figure 5:
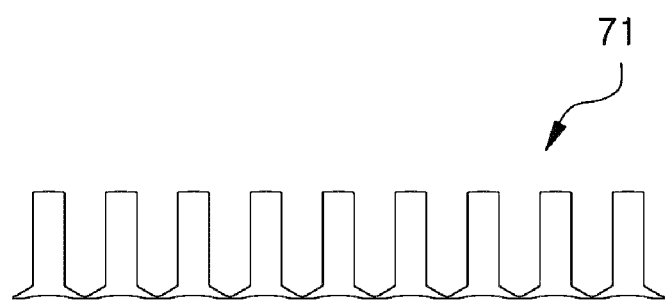
FIG. 5 is an exploded view showing stator cores blank-molded from a silicon steel plate.
Figure 6:
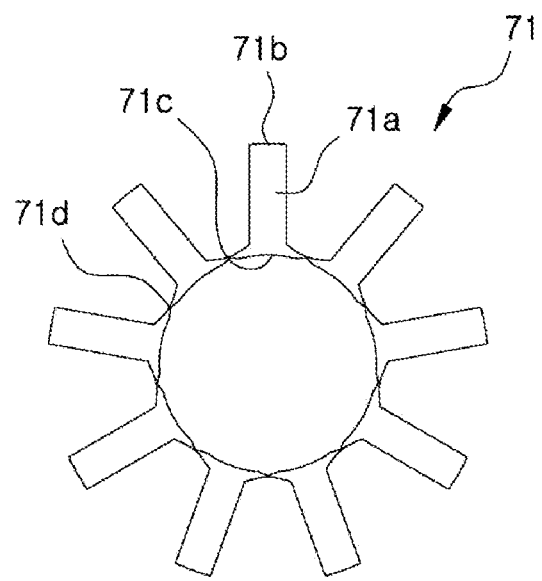
FIG. 6 is a plan view showing stator cores that are modified and placed in the form of an annular shape.

The stator core 71 is configured so that both ends of the stator core 71 are connected as shown in FIG. 6 at a state where the stator core 71 is blank-molded in the lengthy direction, as shown in the FIG. 5, in which the stator core 71 is bent and processed so as to maintain a substantially annular shape. Any structure of connecting both ends of the stator core 71 in order to form a magnetic circuit may be employed. For example, both ends of the stator core 71 may be connected by using caulking, press-fitting, or bonding.

The stator core 71 that has been modified into an annular form from the lengthy direction includes a number of protrusions 71a that are radially arranged outwards to allow outer windings. In this embodiment, nine protrusions 71a are formed and correspond to the case of a 3-phase (U, V, W) wiring structure.

In addition, a number of opposing portions 71c are formed at the inner side of the annular stator core 71, in opposition to the plurality of magnets 53. The number of the opposing portions 71c are connected with each other by a number of connections 71d in succession to each other. In this case, the number of the opposing portions 71c form an annular inner peripheral surface, and preferably form a curved surface having a predetermined curvature to minimize an air gap with respect to the rotor.

As a result, as shown in FIGS. 3 and 6, since the annular stator core 71 forms a slot-less structure in which the number of the opposing portions 71c forming an inner side surface with respect to the number of protrusions 71a are connected with each other by the number of connections 71d, noise and vibration due to a cogging torque that is commonly generated in a motor employing a core type stator can be suppressed.

Figure 7:
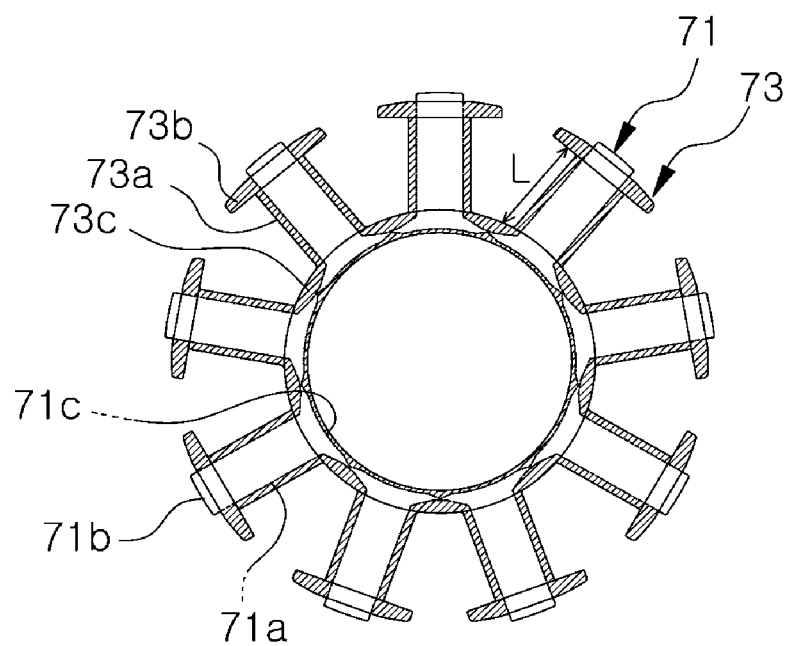
FIG. 7 is a plan view showing a state where a number of stator cores arranged in the form of an annular shape are laminated and then insert-molded in a bobbin.

A number of the annular stator cores 71 are laminated, and then can be formed integrally with insulating bobbins 73 of thermosetting resins through insert molding, as shown in FIG. 7.

The bobbin 73 is open at its inner-center, and is cup-shaped having a hollow portion through which the rotor 50 is inserted. The bobbin 73, unlike the conventional can-shaped cover type, can be implemented into a single structure sealing cover type that is integrally formed with the bobbin 73 without having a separate can cover.

In addition, the bobbin 73 is configured to entirely surround the protrusion 71a and the opposing portion 71c, except for the end 71b of each protrusion 71a of the stator core 71, in which the end 71b of each protrusion 71a of the stator core 71 is exposed to contact the back yoke 77. Moreover, the bobbin 73 is configured so that thickness of a portion of surrounding the outer side of the opposing portion 71c can be formed thinly (for example, 0.6 mm or less) as possible through the insert molding.

As described above, in the present invention, an interval D between the opposing portion 71c and the magnet 53 (see FIG. 3) can be minimized as 1.2 mm or so, and thus a low magnetic ferrite magnet can be used as a rotor magnet instead of an Nd magnet. In addition, the ferrite magnet has a corrosion resistant property and thus does not require a separate sealing resin molding structure. After all, the present invention greatly reduces an air gap between the rotor 50 and the stator 70 into ½ or less, when compared with the conventional case of using the Nd magnet, to thereby significantly reduce material costs and maximize the efficiency of the motor.

As shown in the FIG. 7, the bobbin 73 includes: a number of coil winding portions 73a around which coils are wound while surrounding protrusion 71a of the stator core 71; an outer flange 73b that is protrudingly formed at the end of each coil winding portion 73a, so that the inner side surface of the outer flange 73b defines the area of the coil winding portion 73a and at the same time the outer side surface of the outer flange 73b is compressively combined on the inner circumferential surface of the back yoke 77; and an inner flange 73c that is molded in an annular form to entirely surround the opposing portion 71c of the stator core 71, so that the inner side surface of the inner flange 73c plays a role of a sealing cover and the outer side surface of the inner flange 73c defines the area of the coil winding portion 73a.

The ring-shaped inner flange 73c is cup-shaped having a hollow portion through which the rotor 50 is inserted, and simultaneously is provided with a bearing seated groove 73d formed at the center of the bottom surface thereof in order to support the drive shaft 30 coupled at the center of the rotor 50. A bearing 33 and a bushing 35 are inserted into the bearing seated groove 73d.

Therefore, since the inner flange 73c provided in the bobbin 73 of the stator 70 is cup-shaped in the present invention, a water leakage that occurs from the hollow portion into which the rotor 50 is inserted to the stator 70 can be fundamentally blocked.

The coil 75 is wound on the coil winding portion 73a of the bobbin 73. In this case, the bobbin 73 can be formed so that the distance L (see FIG. 7) between the outer flange 73b and the inner flange 73c becomes wide at the maximum, to thereby heighten a fill factor of the coil 75 and thus enhance the motor efficiency.

Figure 8:
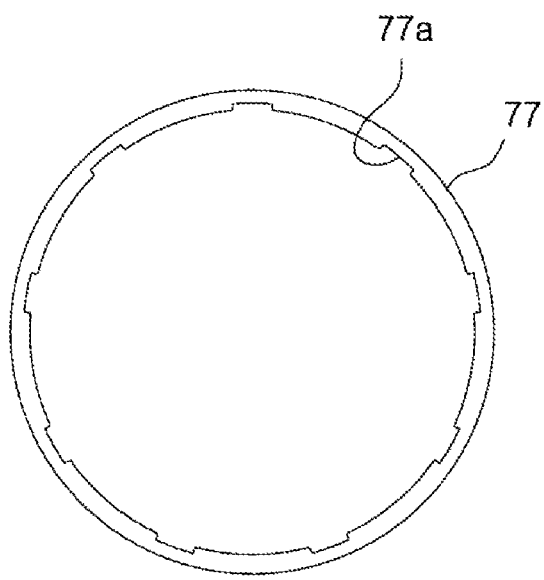
FIG. 8 is a plan view showing a back yoke for forming an outer flux path of stator cores.

In this case, as shown in FIG. 7, before being combined with the back yoke 77 of FIG. 8, the present invention enables an outer winding structure because the number of protrusions 71a are radially formed when the coil 75 is wound on the bobbin 73 formed on the number of protrusions 71a, to thereby heighten winding efficiency and increase a fill factor as well, when compared with an inner winding method that is limited by narrow slots between the protrusions 71a, that is, teeth.

In the case of the coils 75 that are wound around the coil winding portion 73a of the bobbin 73, three coils may be connected in a parallel or serial wiring method by each phase of U, V, W when the motor is a 9-slot-6-pole structure three-phase drive motor as shown in FIG. 3.

As shown in FIG. 8, the back yoke 77 is formed in the form of a ring, and is press-fitted into the outside of the stator core 70 to form an external magnetic center of the stator core 71. In this case, the back yoke 77 is provided with a number of coupling grooves 77a at its side in which the ends 71b of the number of protrusions 71a of the stator core 71 are respectively press-fitted into the number of coupling grooves 77a, so that the back yoke 77 and the stator core 71 are press-fitted with each other by a key/groove structure between the back yoke 77 and the stator core 71.

Thus, the present invention can press-fit the stator core T-shaped teeth (that is, the protrusions) with the annular yoke, and form a robust cross-coupled structure, to thereby remove a BMC molding process for sealing and integrating the entire stator, and to thus achieve process simplification and cost savings.

As described above, in the present invention, at the time of the formation of bobbin 73 for insulating the respective teeth (that is, the protrusions), an air gap between the magnet 53 of the rotor 50 and stator core 71, that is, a gap D is minimized by simultaneously forming an integral type stator waterproof cover, to thus minimize the air gap between the rotor 50 and stator 70 and to thereby maximize the motor efficiency.

In addition, the present invention can minimize an air gap between the stator core 71 and the rotor magnet 53, to thus use a low-cost ferrite magnet as the magnet 53 instead of the expensive Nd magnet. In addition, the stator core 71 is blank-molded in the lengthy direction and then modified in an annular form, to thus minimize a core loss and significantly reduce manufacturing costs.

Furthermore, the present invention can form a single waterproof structure as a can-shaped molded product, to thus omit a separate can cover and simplify the structure, and to thus enable the stator core to be formed in an outer winding method of easy windings so as to be easily manufactured.

Meanwhile, the case that the rotor 50 includes the balance control members 55 and 57 made of brass so as to have a "−" balance structure, has been described in the present embodiment. However, the present invention is not limited thereto, but can use a rotor 150 having a "+" balance structure.

Figure 9:
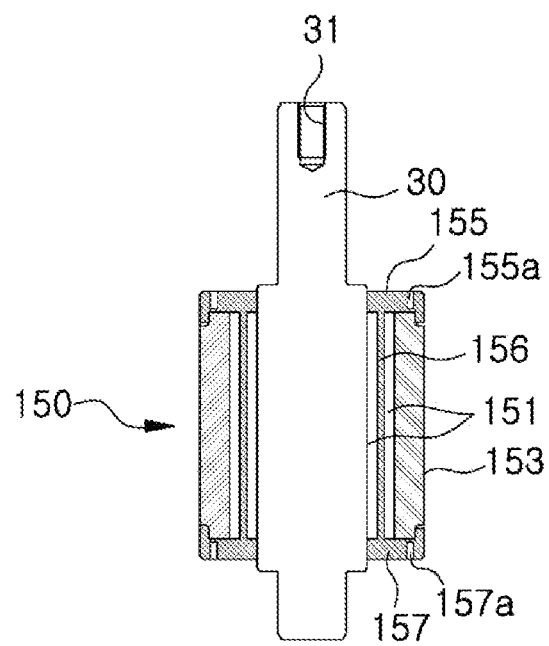
FIG. 9 is a cross-sectional view showing a rotor applied in a water pump motor according to an embodiment of the present invention.
Figure 10:
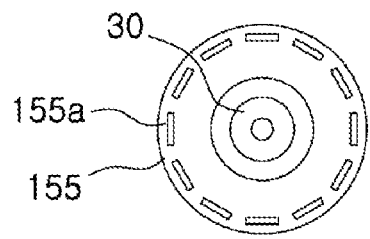
FIG. 10 is a plan view showing a support of a balance control member that also functions as a magnet fixing function shown in FIG. 9.

On the following, referring to FIGS. 9 to 11 a configuration of the rotor 150 having the "+" balance structure will be described.

The rotor 150 is provided with a rotor core 151 fixed to the outer periphery of the drive shaft 30, and the N-pole and S-pole of the number of magnets 153 are arranged alternately on the outer periphery of the rotor core 151. In this case, the rotor core 151 is provided with a plurality of passages 156 that are formed lengthily along the inner side.

Balance fixing members 155 and 157 are combined on the upper and lower ends of the rotor core 151 and the number of magnets 153. The balance fixing members 155 and 157 are integrally connected to each other since molding materials are filled in the passage 156 when the molding materials are injected into the passage 156 of the rotor core 151.

In this case, the balance fixing members 155 and 157 are are combined into the top and bottom ends of the magnets 153, as shown in FIG. 2.

Figure 11:
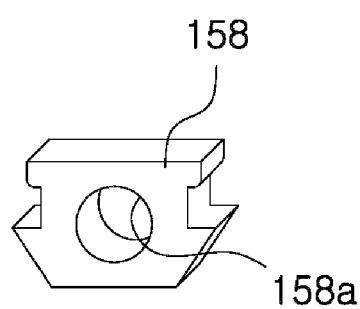
FIGS. 11 and 12 are diagrams showing a variety of examples of weights that are inserted into a balance control member that is detached from or attached to a support shown in FIG. 10.
Figure 12:
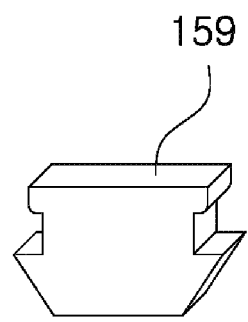

In addition, the balance fixing members 155 and 157 are provided with locking grooves 155a and 157a for inserting weights 158 and 159 shown in FIGS. 11 and 12. The weight 158 shown in FIG. 11 is formed identically in size to the weight 159 shown in FIG. 12, but the weight 158 shown in FIG. 11 is provided with a hole 158a in the inner side thereof, to thus reduce the weight. Accordingly, the user can use a mixture of the weights 158 and 159 to easily perform the "+" balance control.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The present invention can be applied to water pump motors and water pumps which include waterproof structure stators and ferrite magnet rotors that maximize the motor efficiency and reduce manufacturing costs, respectively, and that are provided for the supply of cooling water for engines.

The invention claimed is:

1. A water pump motor having a stator and an inner type rotor disposed inside of the stator, the water pump motor comprising:
  a stator including a stator core: the stator core comprising:
    a plurality of protrusions annularly arranged, wherein each of the protrusions protrudes in a radial direction, and radial inner portions of neighboring protrusions are connected with each other to form a physically integral form of the stator core;
  a bobbin in which the stator core is embedded except for a radial outer portion of each of the protrusions, wherein the bobbin comprises:
    a plurality of coil winding portions each surrounding a corresponding protrusion except for the radial inner portions and the radial outer portions of the stator core such that each protrusion is surrounded by a coil winding portion of the bobbin, a coil wound around the coil winding portions,
    an outer flange formed on a radial outer portion of each coil winding portion, and
    a ring-shaped inner flange formed on a radial inner portion of each coil winding portion, wherein the ring-shaped inner flange connects radial inner portions of neighboring coil winding portions to form a cup-shape composed of an open top portion, a hollow center portion and a closed bottom portion, and wherein a rotor is inserted into the hollow center portion, and a bearing for the rotor is seated in a groove formed in a center portion of the closed bottom portion; and
  an annular back yoke having a plurality of coupling grooves formed on an inner circumferential portion thereof, the radially outer portions of the stator core being coupled with the coupling grooves.

2. The water pump motor according to claim 1, wherein the rotor comprises:
  a rotor core that is coupled to an outer circumference of a drive shaft;
  a plurality of magnets whose N poles and S poles are annularly alternately arranged on an outer circumference of the rotor core; and
  a pair of balance control members that are coupled to upper and lower ends of the rotor core and the plurality of the magnets.

3. The water pump motor according to claim 2, wherein the balance control members are made of a metal.

4. The water pump motor according to claim 2, wherein the balance control members are insert-molded with the rotor core and the plurality of magnets.

5. The water pump motor according to claim 4, wherein the balance control members comprise at least one removable weight piece.

6. A water pump comprising:
  a pump body including an open lower side and forming an accommodation space thereinside;
  a water pump motor according to claim 1, the water pump motor being accommodated in the accommodation space of the pump body;
  an impeller that is connected to a distal end of a drive shaft of the water pump body; and
  an upper case that is coupled to an upper portion of the pump body to guide inlet and outlet of cooling water circulated by the impeller.

* * * * *